May 26, 1964 F. R. HUBER ET AL 3,134,951
COUPLING BETWEEN STATIONARY LAUNCHING MEANS AND MOVABLE
SURFACE WAVE GUIDE MEANS
Filed Sept. 10, 1962
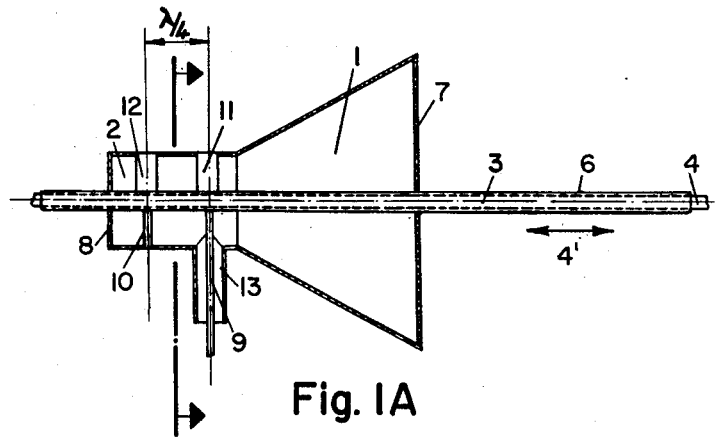
Fig. IA
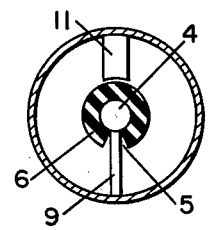
Fig. IB
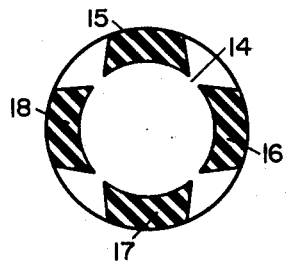
Fig. 2
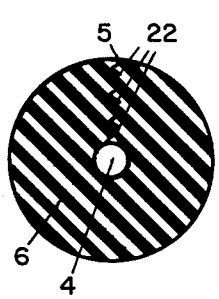
Fig. 3A
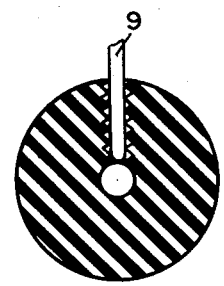
Fig. 3B
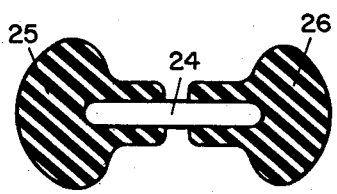
Fig. 4A
Fig. 4B
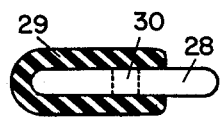
Fig. 5
INVENTORS.
FRANZ REINHOLD HUBER
HEINRICH NEUBAUER
By
ATTORNEY United States Patent Office 3,134,951
Patented May 26, 1964

3,134,951
COUPLING BETWEEN STATIONARY LAUNCHING MEANS AND MOVABLE SURFACE WAVE GUIDE MEANS
Franz Reinhold Huber and Heinrich Neubauer, Munich, Germany, assignors to Rohde & Schwarz, Munich, Germany, a partnership
Filed Sept. 10, 1962, Ser. No. 222,727
Claims priority, application Germany Sept. 28, 1961
12 Claims. (Cl. 333—95)

For the propagation of non-radiating electro-magnetic high frequency waves it is already known to utilize what is usually called a surface wave transmission line in which the field of the propagated energy is concentrated within a space surrounding the line by means of a modification of the surface of a conductor. The modification of the conductor surface generally consists of a layer of dielectric materials; other modification possiblities such as mechanical roughening of the metal conductor, for example in the form of a thread, have not been found practical because a considerable increase of the loss could not be avoided.

Hitherto, in order to couple energy to surface wave transmission lines, the conductor of which is modified by means of a dielectric coating, clamping arrangements have been used; and to produce a galvanic connection between conductor and coupling, the dielectric coating on the coupling points was removed. The resulting damage to the conductor made it difficult, if not impossible, afterwards to locally displace the coupling; furthermore, a step-less sliding connection was completely excluded.

The surface wave transmission line, however, has particular advantage in arrangements in which the length of the line is not predeterminedly fixed. This especially applies to a mobile arrangement because here the line must be adjusted to practically any desired length by guiding at least one end of the line through the associated wave-directing or beaming body which causes the required transformation of the wave mode; thereafter the line is wound up onto a reel or drum. Until now, therefore, surface wave transmission lines of adjustable length have been coupled on or off not galvanically, but capacitively. This, however, had the disadvantage that the energy transfer was not complete. This results, on the one hand, in highly undesirable power losses; on the other hand, it causes disturbances due to undesired radiation. It has been furthermore proposed to improve these conditions by means of capacitive resonators. The corresponding arrangements, however, were rather expensive, and still did not result in a complete energy transfer. They had the further disadvantage of small frequency bandwidths.

One of the objects of the invention is to provide a simple arrangement for coupling an energy feeder to a surface wave transmission line consisting of a metal conductor having a surface modified by a dielectric coating and permitting, without damage to the conductor coating, an easily dissolvable galvanic connection with any desired point along the conductor.

Another object of the invention is to connect the feeder or the outer conductor of a beaming body to a metal conductor coated with a dielectric in such a manner that the conductor is mounted within the beaming body axially displaceable. The surface coating is interrupted, at least at one portion of the circumference of the conductor and along the conductor, so as to make the metal conductor accessible to a contact element for the realization of a galvanic connection.

Thus, in accordance with a further object of the invention, at any desired point along the conductor provided with a surface coating, a galvanic connection is produced between energy feeder and metal conductor, without damage to coating.

Furthermore, by using direct galvanic contact for coupling energy on or off, losses, otherwise unavoidable in capacitive couplings, are avoided; the penetration of residual energy portions in the line portion disposed away from the beaming body can be prohibited by arranging a galvanic connection between the metal conductor and the outer conductor of the beaming body whereby the distance between the two contact points is arranged, in a manner known per se, as a quarter wave length of the average operating wave length, or an uneven multiple thereof.

As a preferred embodiment of the invention, the contact element is formed as an elongated probe, preferably pressure-wise opposed by a counter-element arranged on the conductor side opposite the contact point. The contact element can be formed springy so that a continuous threading of the conductor through the beaming body is permitted without interrupting operation, and/or the contact element can be so constructed as to be fixedly clamped. In this way, after displacement, a good galvanic connection between metal conductor and contact element is achieved which is especially important in case the requirements as to power transfer are particularly high.

In another preferred embodiment of the invention, the surface coating, especially a thermoplastic dielectric, completely surrounds the metal conductor and is slit along the entire length of the conductor in such a manner that the slit, which is usually closed due to the mechanical pretensioning of the coating, may receive the contact element by forcing apart the walls of the slit.

As a further embodiment of the invention it is possible to make the metallic conductor in band shape. This is of special advantage in case minimum loss and a large conductor surface are required and also where the conductor is required to be more flexible than usual, for example to be wound onto a drum of relatively small diameter.

Since such a band shaped conductor profile produces a field concentration along the small sides of the band, in accordance with the invention the coating can be applied to the band edges in such a way as to leave free at least one metallic contact path.

These and other objects of the invention will be more fully apparent from the drawings annexed herein in which:

FIGS. 1A and 1B, in side and front elevations, and in a longitudinal cross section and in a cross section perpendicular thereto, respectively, illustrate a cone shaped beaming body together with a surface wave conductor and appropriate contact elements embodying certain principles of the invention.

FIGS. 2, 3A, 3B, 4A, 4B, and 5 show further preferred embodiments of the invention where, for simplicity's sake, beaming bodies and contact elements are not shown in detail (except in FIG. 3).

In accordance with FIGS. 1A and 1B, beaming body 1 extends into a coaxial line section 2 for the purpose of transforming the coaxial wave mode into the wave type required for surface wave transmission lines.

Surface wave conductor 3 is coaxially arranged with rotary shaped bodies 1, 2; it consists of metallic conductor 4 provided with a dielectric coating 6 having an axially extending recess 5. Surface wave conductor 3 is guided by corresponding recesses in dielectric cover plate 7 of cone 1, as well as corresponding recesses in metallic end plate 8 of coaxial line section 2.

The coupling on or off of the electro-magnetic energy occurs through contact element 9 penetrating in the recess of dielectric coating 6 and thereby effecting connection with metallic conductor 4 which is axially moveable in directions 4'. In order to assure complete freedom of tension of surface wave conductor 3 leaving coaxial line section 2 on the side away from beaming body 1, a further contact element 10 is provided at a distance of a quarter wave length from the on (or off) coupling point of the energy. Contact element 10 provides a short circuit between metallic conductor 4 and the outer conductor of coaxial line section 2.

Contact elements 9 and 10 can be made either springy or clampable after adjustment has been completed. In any case, contact elements 9 and 10 will transfer a certain contact pressure onto surface wave conductor 3, which thereby could be displaced from its axial position. In order to avoid this disadvantageous effect, counter elements 11 and 12 are arranged on the side of surface wave conductor 3 opposite contact elements 9 and 10 respectively. Counter elements 11 and 12 are arranged either sliding on the surface of dielectric coating 6 or provided at their ends with rolls (not shown) engaging the coating surface. Thus, in any case, an exact axial position of the surface wave conductor can be assured. The mechanical connection of conductor 4 with dielectric coating 6 can be assured by glue, or also by a mechanical pretension of the coating. The line length extending on the other side of plate 8 and not carrying high frequency can be wound onto a cable drum (not shown) or mounted in any appropriate manner without departing from the scope of this disclosure.

Similarly not shown in FIGS. 1A and 1B is the connection with the high frequency equipment effected through coaxial cable 13, nor is the outline of the beaming body, which is shown in FIG. 1A at 1, shown in FIG. 1B.

In accordance with FIG. 2, metal conductor 14 is provided with four recesses of swallow-tail shape which are filled with dielectric strands 15 through 18 respectively. In this arrangement, the contact elements are preferably of ring shape, whereby part of each contact element engages the dielectric strands. Such a construction of contact elements has the advantage than an unintentional axial rotation of the surface wave conductor remains without effect on the transfer characteristics of the system because part of the existing contacts will always engage the metallic conductor.

In accordance with FIG. 3A metal conductor 4 is completely surrounded by dielectric layer 6 provided with a longitudinal gap 5. In order to avoid foreign substances penetrating the gap, the side surfaces of the gap are provided with teeth 22. Gap 5 is normally closed and will only be spread in the immediate neighborhood of the contact element as apparent from the further cross sectional representation of contact element 9 shown in FIG. 3B.

FIG. 4 illustrates the use of a band-shaped surface wave conductor which results in a particularly flexible, yet extremely efficient arrangement. In this case metallic conductor 24 is surrounded on its two small sides, and on zones of the broad sides adjacent to the small sides, by dielectric strands 25, 26 which are thickened in a bulging out fashion. The zones of band shaped conductor 24, which are not covered with dielectric serve as contact surfaces. In this arrangement it is possible to utilize two contact elements pressure-wise working against each other so that it is not necessary to provide separate counter elements to take up the contact pressure. As shown in the further cross sectional representation of FIG. 4B, the bulging dielectric strand 27 is provided with a mechanical pretension so as to very firmly grip around band shaped conductor 24.

FIG. 5 shows again a band shaped conductor 28 surrounded by a dielectric strand 29 on its small sides and on considerable sections of its broad sides. In this case the firm connection between metal conductor 28 and dielectric strand 29 is realized by bore-holes 30 arranged in metallic conductor 28 at appropriate distances. Positive gripping can be achieved here by short cylindric projections on dielectric strand 29 engaging bore-holes 30 from both sides. Alternatively, such positive gripping can be effected in the manufacture of strand 29 while it is being applied to metallic conductor 28 in plastic or liquid form whereby parts of the dielectric material penetrate from both sides into bore-holes 30 and flow into each other.

The invention is not limited to the examples or embodiments shown or described.

More specifically, it is possible to vary in many ways the dielectric coating and the type of the recesses axially extending therein. A particularly suitable embodiment for very high frequencies, for example, results from dielectric coatings consisting of an oxide or similar metal layer applied produced onto the metallic coating in otherwise well-known manner, whereby either the formation of this layer is inhibited in a zone extending substantially axially therefrom by previously to oxidation covering up this zone, or the zone is produced by removal of part of the layer on the desired region after oxidation.

We claim:

1. In a surface wave coupling, beaming means including galvanic contact means, a surface wave transmission line including a metal conductor having a surface provided with a dielectric coating axially displaceable in the beaming means, said surface coating being interrupted at least on a portion of the conductor circumference and along the metal conductor so as to permit said contact means to engage said metal conductor.

2. A surface wave coupling according to claim 1 wherein said beaming means consist of an electromagnetic horn extending into a coaxial line section; said contact means consisting of radial probes connecting said conductor and an outer part of said coaxial line section.

3. A surface wave coupling according to claim 1 wherein said contact means consists of a longitudinal probe extending radially into contact with said conductor, there being provided a counter element engaging the conductor coating opposite the contact point.

4. A surface wave coupling according to claim 1 wherein said contact means is of a springy nature.

5. A surface wave coupling according to claim 1 wherein said contact means is mounted clampable on said surface wave transmission line.

6. A surface wave coupling according to claim 1 wherein said coating consists of a thermoplastic dielectric substance completely surrounding the metal conductor and having a slit extending along the entire conductor length in such a way that said contact means is insertable in said slit.

7. A surface wave coupling according to claim 6 wherein said slit is normally held closed by the mechanical pre-tension of the coating, and is opened by means of spreading the walls of the slit upon insertion of said contact means.

8. A surface wave coupling according to claim 1 wherein said surface coating is attached to the conductor by means of glue.

9. A surface wave coupling according to claim 1 wherein said surface coating is attached to said conductor by positive gripping means.

10. A surface wave coupling according to claim 1 wherein said surface coating is attached to said conductor by means of a swallow-tail shaped recesses in said conductor.

11. A surface wave coupling according to claim 1 wherein said metal conductor is of band shape and said surface coating is applied to the band edges in such a way that at least one metallic contact path is left free on the conductor band.

12. A surface wave coupling according to claim 1 wherein said coating in the region of at least one band edge is provided with a peripheral bulge.

References Cited in the file of this patent
UNITED STATES PATENTS

| | | |
|---|---|---|
| 2,668,199 | Connell | Feb. 2, 1954 |
| 2,991,336 | Shaw et al. | July 4, 1961 |